United States Patent [19]
Sinz

[11] Patent Number: 5,946,767
[45] Date of Patent: Sep. 7, 1999

[54] PIPE CLEANING VEHICLE

[75] Inventor: Helmut Sinz, Scheidegg, Germany

[73] Assignee: Gapvax, Inc., Johnstown, Pa.

[21] Appl. No.: 09/053,774

[22] Filed: Apr. 2, 1998

[51] Int. Cl.$^6$ .............................. B08B 3/02; B08B 9/02
[52] U.S. Cl. ........................... 15/302; 15/315; 15/340.1; 15/352; 15/353; 134/109; 134/111; 134/168 C
[58] Field of Search ...................... 15/302, 315, 340.1, 15/352, 353; 134/167 C, 168 C, 109, 111

[56] References Cited

U.S. PATENT DOCUMENTS

| | | |
|---|---|---|
| 287,811 | 11/1883 | Dougine . |
| 2,010,540 | 8/1935 | Evans . |
| 3,600,225 | 8/1971 | Parmelee . |
| 3,658,589 | 4/1972 | Shaddock . |
| 3,842,461 | 10/1974 | Wurster ................................. 15/353 X |
| 4,134,174 | 1/1979 | Flynn et al. ..................... 134/168 C X |
| 4,199,837 | 4/1980 | Fisco, Jr. ......................... 134/168 C X |
| 4,227,893 | 10/1980 | Shaddock .......................... 15/340.1 X |
| 4,322,868 | 4/1982 | Wurster ................................ 15/352 X |
| 4,377,475 | 3/1983 | Wiedemann . |
| 4,490,162 | 12/1984 | Davis .................................... 15/353 X |
| 4,578,198 | 3/1986 | Schmidt et al. . |
| 4,935,984 | 6/1990 | Bryant et al. .................... 134/168 C X |
| 5,114,568 | 5/1992 | Brinsmead et al. . |
| 5,185,087 | 2/1993 | Lister et al. . |
| 5,336,333 | 8/1994 | Sheppard et al. . |
| 5,660,725 | 8/1997 | Klass . |

OTHER PUBLICATIONS

NIBCO "125 lb. w.o.g. and 250 lb. w.o.g. iron body silent check," p. 61 (undated).
Sihi Pumps Brochure "Liquid Ring Vacuum Pumps" pp. 1–11 (1995).

*Primary Examiner*—Philip R. Coe
*Attorney, Agent, or Firm*—Banner & Witcoff, Ltd.

[57] ABSTRACT

The present invention relates to a mobile pipe cleaning vehicle and a process for cleaning pipes with a mobile pipe cleaning vehicle. The vehicle can be used to clean pipes, e.g., wastewater or storm drainage pipes. The vehicle includes a tank housing divided into three tanks: a sludge tank for holding water with a high degree of sludge and debris, a water supply tank for supplying water to a high pressure pump for high pressure spraying of a pipe to be cleaned, and a water-in-use tank disposed between the water supply tank and the sludge tank. Water used from the water-in-use tank is used for helping to create a seal in a liquid ring vacuum pump, enabling the sludge tank to be placed in a vacuum. Cooler water in the sludge tank and the water supply tank cool the water in the water-in-use tank to prolong the life and increase the efficiency in the liquid ring vacuum pump. A filtration system includes a first filtration device in the sludge tank, second and third filtration devices between the sludge tank and the water supply tank, and a fourth filtration device between the water supply tank and the high pressure pump. A water recycling pump pumps the water from the sludge tank through the first, second, and third filtration devices. If the water supply tank becomes substantially filled, the water recycling pump will pump water from the water supply tank through the second and third filtration devices to further clean the water. The fourth filter is disposed between the water supply tank and the high pressure pump to ensure that the water reaching the high pressure pump is virtually clean, thus significantly prolonging the life of the high pressure pump.

17 Claims, 4 Drawing Sheets

PIPE CLEANING VEHICLE

FIELD OF THE INVENTION

This invention relates to a mobile pipe cleaning vehicle and a process for cleaning pipes with a mobile pipe cleaning vehicle. More specifically, the invention relates to a vehicle that can be used to clean pipes, e.g., wastewater or storm drainage pipes, that can be continuously operated by cleaning dirty water retrieved from the pipes and recycling it into a supply for cleaning the pipes, and/or to "dewater" sludge.

BACKGROUND OF THE INVENTION

Sewer pipe cleaning vehicles are used to remove debris from clogged and partially clogged pipes that typically range in size between 2 and 60 inches in internal diameter. These vehicles are typically transported adjacent to a pipe access, e.g., a manhole. A first hose is coupled to a high pressure pump, and a second pump is connected to a sludge container that is maintained at a vacuum. The first hose has a nozzle at its end opposite the high pressure pump. The two hoses are lowered into a desired pipe to be cleaned. Water is pumped from the high pressure pump through the first hose and sprayed out of the nozzle into the pipe to loosen debris from the pipe interior wall. Simultaneously, a vacuum is applied to suck debris-laden water through the second hose from the pipe into the vacuum container.

For many years pipe cleaning vehicles have been limited by how much supply water and debris-laden water could be held in the vehicle. This was because the supply water container would become depleted and would need to be refilled, or because the debris-laden water tank would become filled and would need to be emptied. Thus, the cleaning process would have to be stopped until at least one of these two functions were performed. This would normally entail many time consuming tasks including driving the vehicle off-site. This has made many prior art pipe cleaning vehicles impractical and simply too ineffective for use in cleaning many pipes because of their limited capacity to clean.

In an attempt to overcome these drawbacks, some prior art cleaning vehicles, such as the one disclosed in U.S. Pat. No. 4,377,475, have been made with water-recycling systems. These vehicles filter the debris-laden water sucked-up from the pipe and use the filtered water to spray back into the pipe. However, many of these prior art cleaning vehicles have been constructed with a waste of components, and they may not fully meet the necessary operational requirements and/or may not work economically. For example, they have been extremely susceptible to failure of the vacuum pump and to failure of the high pressure pump. Moreover, they have not sufficiently cleaned the water for certain recycling needs. Additionally, they still have been susceptible to being rapidly filled, forcing the vehicle to be transported off-site for drainage of the sludge tank.

Another drawback of prior pipe cleaning vehicles that recycle the water has been the pump and system used for creating a vacuum to draw water up from the pipes. Some of the vacuum pumps used have been positive displacement vacuum pumps. However, these pumps have significant drawbacks and have had a relatively high failure rate. Some prior pipe cleaning vehicles have used a liquid ring vacuum pump. However, these pumps have created a problem in these vehicles because the water used by these pumps to create the seal normally gets very hot, requiring the operator of the vehicle to stop the cleaning process and cool the pump down. Moreover, these pumps have required large and bulky external heat exchangers having many pipes in an attempt to cool this heated water.

Yet another drawback of prior pipe cleaning vehicles that recycle the water has been poor filtration of the water being recycled, causing the high pressure pump to fail prematurely. This has caused some high pressure pumps to fail after only 30 hours of use. Additionally, nozzles used for cleaning the pipes have failed prematurely due to the poor filtration of the water.

Thus, an improved pipe cleaning vehicle was needed.

SUMMARY OF THE INVENTION

Accordingly, it is an object of the present invention to provide an improved vehicle for cleaning pipes having an internal diameter between the full range of 2 inches and 60 inches.

It is another object of the present invention to provide a vehicle whereby the water recycling system can continuously operate such that the life of the high pressure pump is extended and post-filtered water can be sprayed back into the sewer lines. More specifically, it is an object of the present invention to extend the life of high pressure pump from 30 hours up to or over 400 hours.

It is yet another object of the present invention to use a water recycling system with a multistage filtration system that reduces the water down to a substantially non-abrasive state.

It is another object of the present invention to provide a vehicle for cleaning pipes including a body, a tank housing, a pressure spray hose, a vacuum hose, a pressure pump, and a vacuum pump. The tank housing is attached to the body and includes first and second internal walls that divide the tank container into first, second, and third tanks. The second tank is positioned between the first and third tanks. The first internal wall separates the first and second tanks, and the second internal wall separates the second and third tanks. The pressure spray hose is fluidly connected to the first tank, and the vacuum hose is fluidly connected to the third tank. The pressure pump is fluidly coupled to the pressure spray hose and the first tank for spraying fluid under pressure from the first tank through the pressure hose. The vacuum pump is fluidly coupled to the second and third tanks. More particularly, the vacuum pump is fluidly coupled to the third tank to permit a vacuum to be maintained in the third tank, and the vacuum pump is fluidly coupled to the second tank to permit fluid from the second tank to be used by the vacuum pump to create the vacuum. The second tank is positioned relative to the first and third tanks permitting the fluid in the first and third tanks to cool the fluid in the second tank.

It is yet another object of the present invention to provide a vehicle for cleaning pipes including a body, a sludge tank mounted to the body, a water supply tank mounted to the body, a high pressure pump, a spraying hose, a vacuum hose, a vacuum pump, a water recycle pump, and first and second filtration devices. The high pressure pump is fluidly coupled to the water supply tank. The spraying hose is fluidly coupled to the high pressure pump for spraying water from the water supply tank into a pipe to be cleaned. The vacuum hose is fluidly coupled to the sludge tank. The vacuum pump places the sludge tank in a vacuum permitting the vacuum hose to suck fluid and debris from a pipe to be cleaned. The first filtration device is positioned inside the sludge tank for filtering particles from water inside the sludge tank and providing filtered watered at a first outlet of the first filtration device. The second filtration device is fluidly coupled to the water supply tank and the sludge tank such that water filtered by the second filtration device is supplied at a first outlet of the second filtration device and particles filtered out of the water by the second filtration device are supplied at a second outlet of the second filtration device. The first outlet of the second filtration device is fluidly coupled to the water supply tank and the second outlet of the second filtration device is fluidly coupled to the sludge tank. The water recycle pump is fluidly coupled to the first outlet of the first filtration device and the water supply tank for providing pressurized water from either or both of the sludge tank and the water supply tank to the second filtration device. A third filtration device can be located between the second filtration device and the water supply tank for providing even less abrasive water to the water supply tank.

It is yet another object of the present invention to provide a method for cleaning a pipe with a vehicle. The method includes providing a vehicle having a sludge tank, a water supply tank, a high pressure pump, a spraying hose, a vacuum hose, a vacuum pump, and first, second, and third filtration devices. Filling the water supply tank with water. The vehicle is transported to a site adjacent a pipe to be cleaned. The spraying hose and the vacuum hose are extended into the pipe to be cleaned. The high pressure pump is activated to spray water through the spraying hose and into the pipe to be cleaned. The vacuum pump is activated to create a vacuum in the sludge tank and to draw water and debris from the pipe to be cleaned through the vacuum hose and into the sludge tank. Water in the sludge tank is filtered by the first filtration device. The water filtered by the first filtration device is conveyed to the second filtration device. Water previously filtered by the first filtration device is filtered by the second filtration device to divide the water into a cleaner portion and a dirtier portion. The dirtier portion of the water is conveyed from the second filtration device into the sludge tank, and the cleaner portion of the water is conveyed from the second filtration device into a third filtration device. Water previously filtered by the first and second filtration devices is filtered by a third filtration device to divide the water into a cleaner portion and a dirtier portion. The dirtier portion of the water is conveyed from the third filtration device into the sludge tank, and the cleaner portion of the water is conveyed from the third filtration device to the water supply tank. Additionally, water from the water supply tank that has been filtered by the first, second and third filtration devices is conveyed back into the second filtration device.

These and other objects of the present invention will be apparent from the description below.

DETAILED DESCRIPTION OF THE PREFERRED EMBODIMENT

Figure 1:
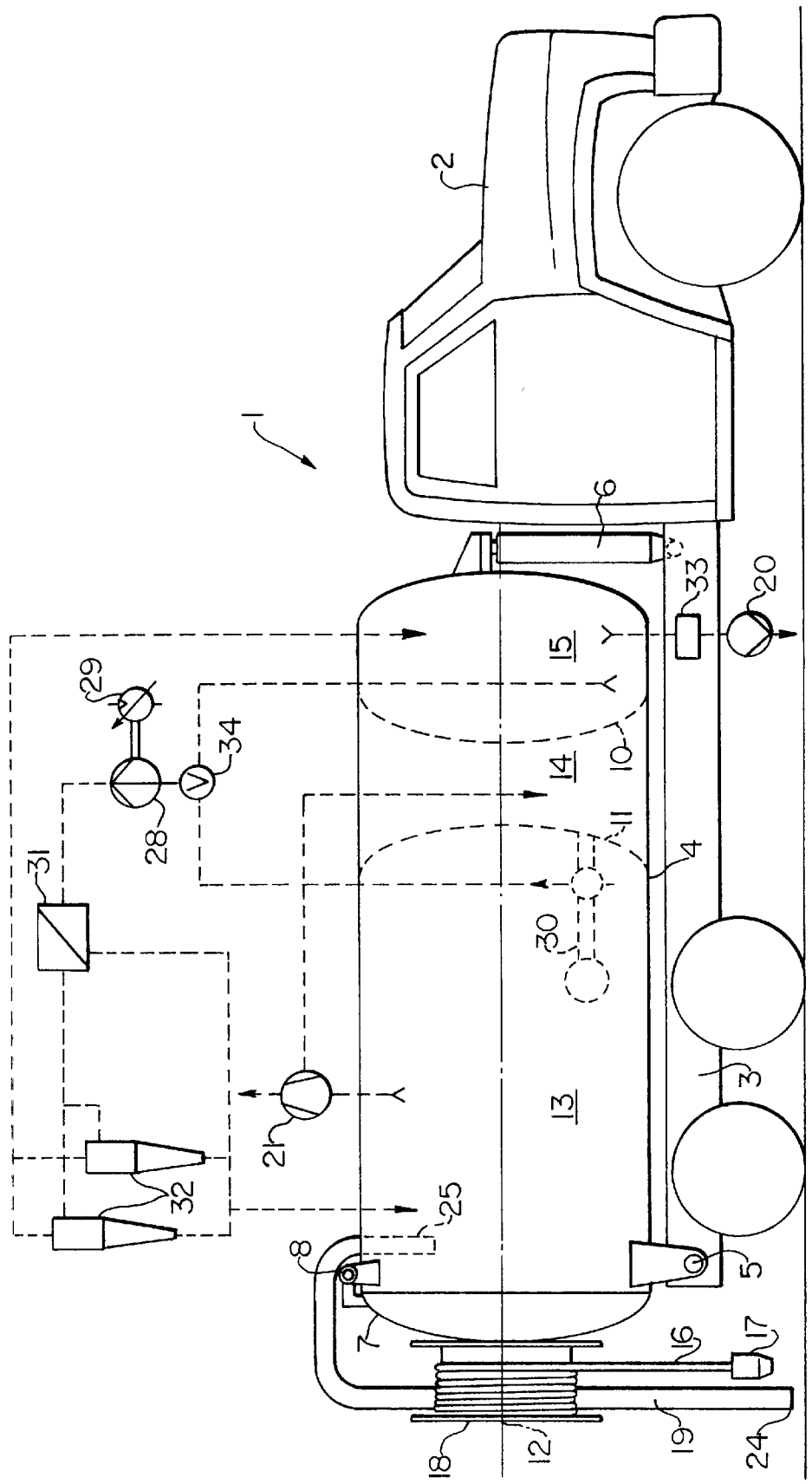
FIG. 1 is a side elevational view schematically depicting the pipe cleaning vehicle of the present invention.

An improved pipe cleaning vehicle is shown in FIGS. 1–4 and is designated generally by reference numeral 1. An overview of the vehicle and its operation is described immediately below with reference to FIG. 1. However, specific details of the water recycling system, the vacuum system, and the high pressure water supply system of the pipe cleaning vehicle, are described below with specific reference to FIGS. 2, 3, and 4, respectively.

As shown in FIG. 1, the pipe cleaning vehicle 1 includes a front cab 2 and a bed 3 extending rearwardly of the cab 2. A large tank or tank housing 4 is pivotally mounted to the bed 3 adjacent the rear of the bed 3, via a conventional pivot linkage 5, e.g., brackets and a hinge pin. A tilting cylinder 6 is mounted between the bed 3 and the tank housing 4. The tilting cylinder 6 operates in a conventional manner such that the extension of a rod in the tilting cylinder 6 causes the front of the front of the tank housing 4 to lift off of the bed 3 as the tank housing 4 pivots about the pivot linkage 5. The rear end of the tank housing 4 includes a pivotally mounted door 7 coupled to the remainder of tank housing 4 by a conventional pivot linkage 8. One or more rear door lifting cylinders, not shown, are operable to move the rear door 7 between open and closed positions in a conventional manner. Thus, the vehicle 1 is designed as a dumper. As described in more detail hereinafter, this permits simple sludge dumping and guarantees free access to the aggregates and the debris in the rear of the tank housing 4 during the maintenance and repair of the vehicle 1.

The tank housing 4 is divided into three sections or separate tanks 13, 14, and 15 along its longitudinal axis 12 by front and rear internal walls 10 and 11, respectively. The tank in the rear-most section of tank housing 4 is a sludge tank 13. The tank in the front-most section of tank housing 4 is a water supply tank 15. A water-in-use tank 14 is positioned between the sludge tank 13 and the water supply tank 15. Front internal wall 10 divides and separates water supply tank 15 and water-in-use tank 14 by forming the rear wall of water supply tank 15 and the front wall of water-in-use tank 14. In a similar manner, rear internal wall 11 separates sludge tank 13 and water-in-use tank 14 by forming the front wall of sludge tank 13 and the rear wall of water-in-use tank 14.

At least one high pressure hose 16 is coupled at one end to a high pressure pump 20. The other end of high pressure hose 16 has a nozzle 17 for high velocity spraying into pipes to be cleaned. High pressure pump 20 supplies water from the water supply tank 15 to the high pressure hose 16. High pressure hose 16 is mounted to a reel 18 on the rear of the tank 4. A vacuum hose 19 is located adjacent high pressure hose 16 at the rear end of tank 4. Vacuum hose 19 may be controlled and driven by any conventional mechanism and/or in any known manner. The lower end 24 of vacuum hose 19 extends down into a desired pipe to be cleaned, not shown, while the upper end 25 of the vacuum hose 19 is fluidly coupled to extend into the top of the sludge tank 13 adjacent its rear end. A vacuum pump 21 creates a negative pressure inside of sludge tank 13, and utilizes water, or another fluid, from inside the water-in-use tank 14 to help the vacuum pump 21 create a seal and form the vacuum. Water sprayed inside the pipe to be cleaned through nozzle 17 of high pressure hose 16 is sucked-up with debris from inside the pipe through vacuum hose 19, and deposited into sludge tank 13 adjacent its rear end.

The debris-laden water deposited into sludge tank 13 is recycled by a water recycling pump 28 and elements that perform a multi-stage filtration/cleaning process, such that the clean filtered water can be deposited into the water supply tank 15 for reintroduction into a pipe to be cleaned by the high pressure pump 20. As explained in more detail hereinafter, the multi-level filtration system includes a coarse filter 30, a fine filter 31, cyclone filters 32, and an ultra fine filter 33. The water recycling pump 29 pumps water through the coarse filter 30, the fine filter 31, and the cyclone filters 32 such that debris-laden water deposited in sludge tank 13 is serially filtered to remove smaller sized particles in the water, and to ensure that only clean water is deposited back into the water supply tank 15. An alternating valving arrangement 34 is coupled to the sludge tank 13, the water supply tank 15 and the water recycling pump 28, and permits the further filtering of the clean water in the water supply tank 15 by refiltering it through the fine filter 31 and the cyclone filters 32 based on the level of water in the water supply tank 15.

Figure 2:
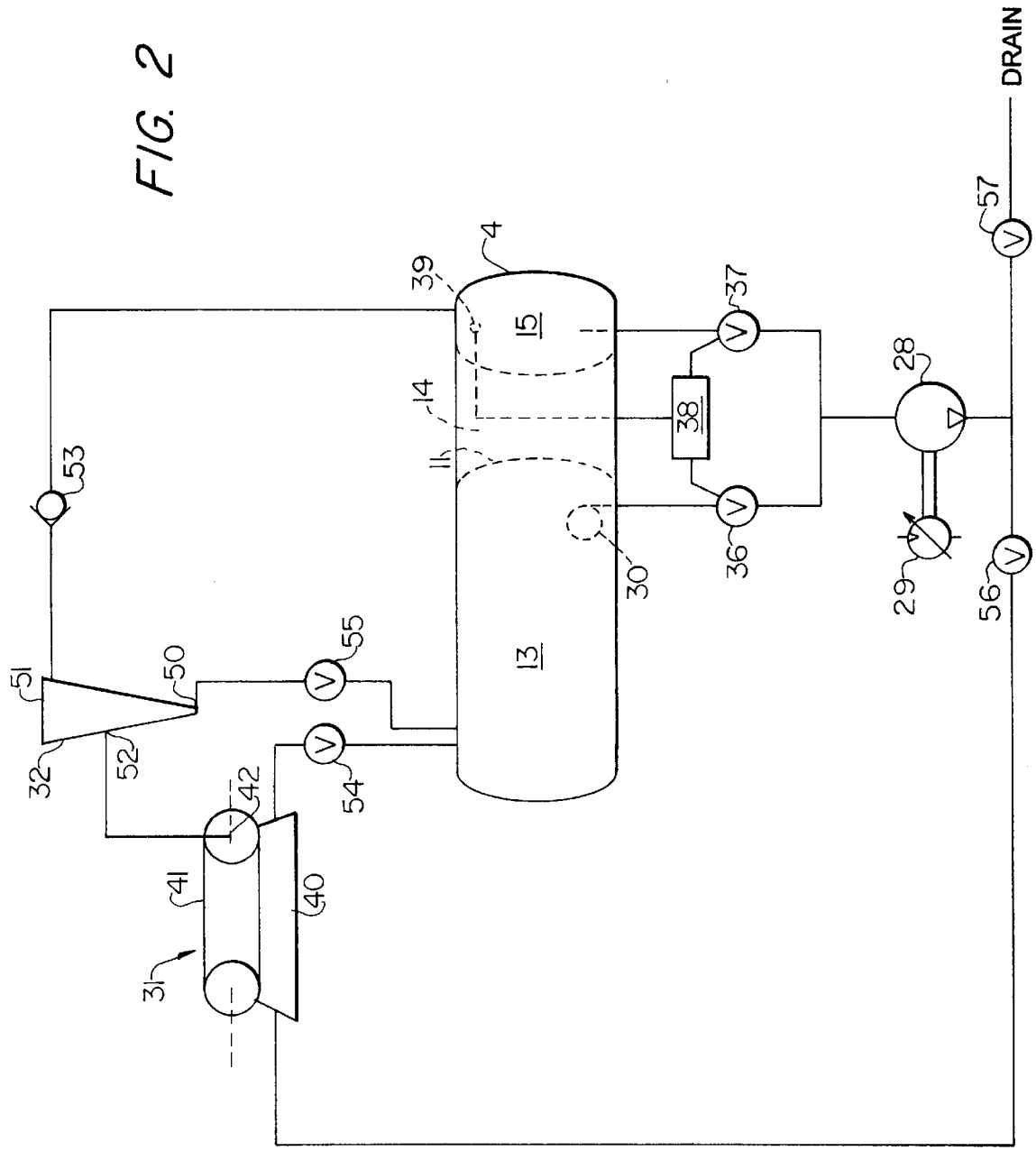
FIG. 2 is a schematic of the water recycling system of the pipe cleaning vehicle of FIG. 1.

As shown in more detail in FIG. 2, the water recycling system pumps water from the sludge tank 13 through a filtering system depositing the cleaner filtered water into the water supply tank 15 and redepositing debris-laden water into the sludge tank 13. The coarse filter 30 is mounted within the sludge tank 13 near the forward end of the sludge tank 13, i.e., near internal wall 11, and is positioned slightly above the base of the sludge tank 13. The purpose of the coarse filter 30 is to filter out the relatively larger debris from the water in the sludge tank 13, thus permitting initially filtered water to be pumped through other filters for recycling this water into a clean water supply. The front internal wall 11 of sludge tank 13 is opposite the sludge inlet. Thus, the coarse filter 30 is positioned in an area where the water is cleaner than the area towards the rear of the sludge tank 13 because the coarse filter 30 is spaced from the rear of the sludge tank 13 where the debris-laden water is first deposited. Due to the principles of gravity and friction, many larger particles will tend to settle on the floor of the sludge tank 13, rearwardly of coarse filter 30, and never reach the coarse filter 30. This inherent filtering capability is increased when the front of the tank housing 4 is slightly raised by cylinder 6, and avoids the need to have many larger particles on the bottom surface of the sludge tank 13 interact with coarse filter 30. In a preferred embodiment, the coarse filter 30 used can be similar or identical to that disclosed in U.S. Pat. No. 5,660,725, which is incorporated by reference herein. Thus, coarse filter 30 can include a rotating screen that rotates about a horizontal axis and can move vertically as a function of the water level in the sludge tank 13 to filter the water above the bottom surface of the tank housing 4. However, other filtering devices could be used in lieu of this filter 30. In a preferred arrangement, the coarse filter 30 operates to be a $700\mu$ filter, i.e., it should prevent any particles having a diameter greater than $700\mu$ from passing through the filter.

The alternating valving arrangement 34 is formed in part by a sludge tank exit valve 36 positioned between the sludge tank 13 and the water recycling pump 28, and a first water supply tank exit valve 37 positioned between the water supply tank 15 and the water recycling pump 28. These valves are coupled to a controller 38 for automatic operation based on a sensor 39 positioned near the top of the water supply tank 15. The controller 38 controls valves 36 and 37 such that only one of the two valves 36 and 37 is open at any given operational time. This prevents the less clean water from leaving the coarse filter 30 and mixing with the cleaner water in the water supply tank 15. The controller 38 and sensor 39 operate to close water supply tank exit valve 37 and to open the sludge tank exit valve 36 for pumping water from the sludge tank 13 through the fine filter 31 and cyclones 32 for filtration when the water level in the water supply tank 15 drops below a predetermined height, i.e., below the sensor 39. The controller 38 and sensor 39 close the sludge tank exit valve 36 and open water supply exit valve 37 when the water level in the water supply tank 15 is above the predetermined height, i.e., above the sensor 39. When the water supply exit valve 37 is opened, the cleaner water from the water supply tank 15 is pumped again through the fine filter 31 and cyclones 32 to achieve an even greater water quality. This arrangement ensures that there is always a substantially full clean water supply in the water supply tank 15. The valves 36 and 37 are preferably standard parts. In one preferred arrangement, sludge tank exit valve 36 is a standard slide valve, and first water supply exit valve 37 is a standard butterfly valve. Similarly, the controller 38 and sensor 39 may be standard industry parts and may be purchased together.

The water recycling pump 28 supplies the water-recycling system with water. A hydraulic drive 29 is preferably used to automatically regulate pump 28 independently of the speed of the truck engine and the speed of the pump 21 used for creating a vacuum in the sludge tank 13. It is recognized that the pump drive 29 need not be hydraulic and that other pump drive types could be used. The independent control of the pump 28 is important as it permits the water recycling system to deliver water to the cyclones 32 at a constant pressure and at a steady flow rate. This, in turn, maximizes the effectiveness and efficiency of the cyclones 32. The specific desired pressure of the water will depend upon the specifications of the cyclones 32 chosen, which can vary based on the size and specifications of many other elements in the system. In one preferred arrangement, the water recycling pump 28 is mounted lower than the coarse filter 30 and is gravity fed.

The outlet of the water recycling pump 28 is fluidly coupled to the inlet of the fine filter 31. The fine filter 31 further filters the water and preferably operates as a $300\mu$ filter, i.e., it should prevent any particles having a diameter greater than $300\mu$ from passing through it. Fine filter 31 is similar to the coarse filter 30 in conceptual operation, and accordingly includes a finer screen. The fine filter 31 preferably includes a trough 40 and a rotating cylindrical screen 41 positioned above the trough 40. In operation, the water from the pump 28 comes in the bottom of the trough 40 and the particles that are less than $300\mu$ in diameter pass through the rotating screen 41 and out an outlet orifice 42 positioned along the axis of rotation of the rotating screen 41. The particles filtered by the screen, i.e, particles typically greater than $300\mu$, travel from the trough 40 of the fine filter 31 into the rear of the sludge tank 13. Further, in a preferred embodiment, the fine filter 31 is fixedly mounted in a separate chamber outside of tank housing 4. This is advantageous because the fine filter 31 needs to be highly efficient to filter all debris between $300\mu$–$700\mu$, and by placing it in a separate chamber in its own environment, this efficiency level can be achieved. Further, accessibility is enhanced by this arrangement.

The water just filtered by the fine filter 31 enters a header en route to a cyclone bank consisting of separate small-sized cyclones 32 connected in parallel, while the particles that are too big to pass through the rotating screen 41 fall back into the rear of the sludge tank 13. Cyclones 32 operate by providing a fluid inlet into the cyclones at an inlet orifice 52 located at a point between the cyclone bottom, i.e., the apex 50, and the cyclone top, i.e., the vortex finder 51. Small particles, e.g., fine sand, heavier than a predetermined weight fall and exit from the apex 50 of the cyclone 32, while purer water and particles weighing only less than the predetermined amount rise around the rim of the cyclone 32 and exit from the vortex finder 51. The small diameter of the cyclones 32 make the separation of very small particles possible which is of great importance for the quality of the water. As previously described, in order for the cyclones 32 to have maximum efficiency, the supplied water should be held at a constant pressure, the value of which is determined by the specifications of the cyclones 32. In the present invention, the heavier, i.e., dirtier, water travels from the apex 50 of the cyclone 32 into a common header and back into the rear of the sludge tank 13. The cleaner water travels from the vortex finder 51 of the cyclones 32 into a common header, and from the common header into the water supply tank 15.

In one preferred arrangement, seven-to-nine cyclones 32 are used, and each is mounted to the vehicle 1 with its respective axis tilted 30°–45° towards the rear of the truck. This helps ensure that the heavier particles from the cyclones 32 travel toward the rear of the sludge tank 15 and do not clog the apexes 50 of the cyclones 32. The cyclones 32 can be of any suitable size depending upon the number of cyclones used, the size of the truck and tanks, and the specifications of the recycle pump and other elements in the water recycling system. However, one preferred cyclone design is model no. U2-1436 from Krebs Cyclone of Menlo Park, Calif. It is estimated and preferred that the filtered water exiting from the vortex finders 51 of the cyclones 32 will not have particles with diameters greater than in the range of $20\mu$–$80\mu$. Thus, the water in the water supply tank 15 will be clean and should not have particles in the water with diameters greater than $20\mu$–$80\mu$. This will prolong the life of the high pressure water pump 20. Moreover, cleaner water is obtained in the water supply tank 15, each time the water supply tank 15 fills up and its water is repumped through the fine filter 31 and the cyclones 32.

A valve 54 is positioned in-line between the dirty water output of the fine filter 31 and the sludge tank 13, and another valve 55 is positioned in-line between the dirty water output of the cyclone bank 32 and the sludge tank 13. Valve 55 is normally open so that the dirty water filtered from cyclones 32 is returned into the sludge tank 13. Valve 55 is preferably closed when the recycle pump 28 is off. In a preferred embodiment, valve 54 is a three position valve. Similar to valve 55, valve 54 is preferably closed when the recycle pump is off. Valve 54 is preferably in a partially open position when the recycle pump is on so that the dirty water filtered from fine filter 31 is returned into the sludge tank 13. Valves 54 is preferably in a fully open position when fine filter 31 is being flushed. A check valve 53 is placed between the vortex finders 51 of the cyclones 32 and the water supply tank 15 to prevent dirty water backflow into the water supply tank 15 the event of a failure by valve 55.

Valves 56 and 57, preferably manual butterfly type valves, are placed on opposite sides of a tee extending from recycle pump 28. Under normal operating conditions, valve 56 is open, while pump-off valve 57 is closed. At the end of a day of operation, it is preferable to dewater the sludge in sludge tank 13 for removal therefrom. To accomplish this, valve 56 is closed, and pump-off valve 57 is opened. Under these conditions, when recycle pump 28 is turned on, the sludge in tank 13 is dewatered as the water in sludge tank 13 is forced out to a drainage area or container. It is preferred that valve 56 be coupled by a switch, not shown, to fine filter 31, so that fine filter 31 is turned off automatically when valve 56 is closed. The remaining sludge in the sludge tank 13 can be removed through the rear of the tank housing 4 by opening the rear door 7 and tipping the tank housing 4 by cylinder 6.

Figure 3:
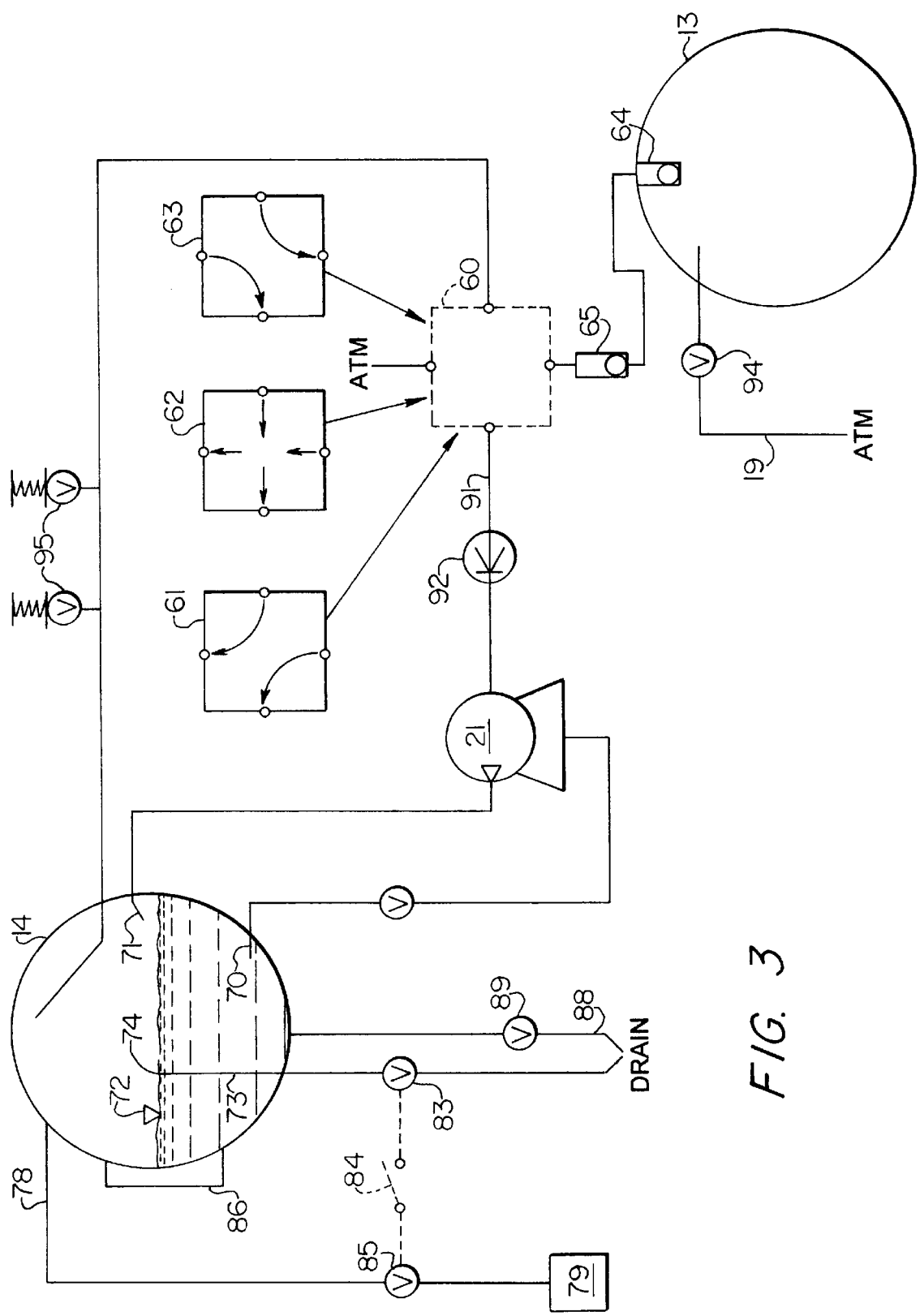
FIG. 3 is a schematic of the vacuum system of the pipe cleaning vehicle of FIG. 1.

Details of the system for placing the sludge tank 13 in a vacuum are shown in FIG. 3. The vacuum system includes vacuum pump 21. In the preferred embodiment, vacuum pump 21 is a liquid ring vacuum pump, and as such, it uses water, air, and an eccentrically mounted rotating impeller to create the vacuum for the sludge tank 13. In use, water is used to create a seal around the outside of the rotating impeller. Using a liquid ring pump for vacuum pump 21 is advantageous because it is much quieter than other vacuum pumps, suffers from lower wear because there are no moving seals, and no oil is exhausted. A preferred water ring pump that can be used for this purpose is model no. LPH 70540 by Sihi Pumps of Grand Island, N.Y. However, other liquid ring vacuum pumps could be used. The motor for this pump 21 can be hydraulically or mechanically driven.

The water supplied to the vacuum pump 21 to help create the vacuum is located in the center tank, i.e., the water-in-use tank 14. The water inlet line 70 to the vacuum pump 21 extends into the bottom portion of the water-in-use tank 14. However, it is spaced slightly above the bottom surface, e.g., 1–2 inches above the bottom surface, to avoid pumping and particles that may have entered the water-in-use tank 14 and settled on the floor surface of the tank 14. The placement of the end of the pump water inlet line 70 adjacent the floor of the tank 14 provides an added benefit in that it supplies the liquid ring vacuum pump 21 with substantially the coldest temperature water in the tank 14, which increases the efficiency of the vacuum pump 21.

The end of the pump water outlet line 71 from the vacuum pump 21 extends into in the water-in-use tank 14 slightly above a fixed predetermined water level 72. The positioning of the water inlet 70 and the water outlet 71 relative to the water level 72 is crucial. If the water level rises above the location of the water outlet 71 of the vacuum pump 21, it agitates the water-in-use tank 14. Such an event, if permitted to occur, would allow undesirable particles on the floor of the water-in-use tank 14 to enter the pump water inlet line 70, and subsequently, to enter the vacuum pump 21. If an insufficient amount of water is filled in the water-in-use tank 14, the water level may fall below the location of the water inlet 70 of the vacuum pump 21. This will cause the vacuum pump 21 to loose its seal and not hold the desired vacuum. To eliminate these possibilities, an automatic filling system has been provided.

The automatic filling system includes, in part, a drain pipe 73 that extends upwardly into the water-in-use tank 14 and has its upper end 74 open. Thus, when the water-in-use tank 14 is being filled through fill line 78, typically by attaching a water source, e.g., a hydrant, to coupling 79, the operator can tell when the exact desired water level 72 has been reached because water will start coming out of the bottom of the drain pipe 73. When the operator notices that water level 72 has been reached, by observing water passing through the bottom of the drain line 73, the operator may manually close valve 85 in the fill line 78. A switch/controller 84 is automatically actuated by the closing of valve 85 to send a signal to close valve 83 in the drain line 73. The coupling 79 preferably includes a check valve to prevent user from being splashed during the tank filling process. A glass viewing panel 86 can also be used to provide a secondary visual check of the water level in the tank 14. A second drain line 88 with valve 89 has an end at the bottom of tank 14 to drain the water-in-use tank 14 for periodic cleaning and for purging the water-in-use tank 14 in cold climates. To refill the water-in-use tank 14, the valve 85 is opened, automatically causing switch/controller 84 to open valve 83 to prevent overfilling of water-in-use tank 14.

When the water is used in the water ring vacuum pump 21, a high amount of energy is dissipated by the rotation of the impeller, and this dissipated energy takes the form of heat increasing the temperature of the water cycled through the vacuum pump 21. Accordingly, the water being deposited back into tank 14 through pump water outlet 71 is higher than the temperature of the water at the pump water inlet 70. Without a feasible way to cool this water in the water-in-use tank 14, the temperature of this water would become too hot for effective use with the water ring vacuum pump 21. However, the design of the segmented tank housing 4, inherently permits the water in the sludge tank 13 and the water in the water supply tank 15, both having temperatures that are lower than the water exiting from the vacuum pump 21, to cool the water in the water-in-use tank 14, based on well known heat transfer principles. Thus, the large surfaces of the internal walls 10 and 11 between the neighboring chambers 13 and 15 provide a simple, efficient, compact, and inexpensive way to permit heat dissipation from the water-in-use tank 14 without a complicated cooling system. Further, the capability of being able to provide cooler water to the liquid ring vacuum pump 21 results in the seals lasting longer, and provides the ability to run the vacuum pump 21 longer and with a higher vacuum because the cooler water has a lower viscosity and a creates better seal.

A four-way valve 60 can be placed in a vacuum mode position 61, a neutral position 62, and a pressurize mode position 63. In a preferred embodiment, the four-way valve 60 is piston/cylinder controlled and remotely operable. The position of the four-way valve 60 governs the direction of airflow. To help prevent water from being sucked up from the sludge tank 13, one float ball valve 64 is mounted inside the sludge tank 13, and another float ball valve 65 is mounted outside the sludge tank 13. The float valve 64 inside of the tank seals the opening between the tank 13 and the pump 21 in the event that the dirty water in the sludge tank 13 fills the tank, ensuring that dirty water will not get sucked up into the pump 21. The float valve 65 outside of the tank 13 seals the opening the in the event that the float valve 64 inside the tank 13 becomes stuck in the open position.

When four-way valve 60 is placed in the vacuum mode position 61, air is circulated through the system in a direction to create a vacuum inside sludge tank 13 by drawing gases from the top of the inside of sludge tank 13 through the two serially positioned float ball valves 64 and 65. A one-way check valve 92 protects the vacuum pump 21 if a back pressure forms. Simultaneously, the air drawn from the sludge tank 13 is discharged into the water-in-use tank 14 through the pump water outlet line 71, and the air from the inside top of the water-in-use tank 14 is drawn and discharged to the atmosphere. Spring-loaded pressure relief valves 95 may be used on the line between the water-in-use tank 14 and the four-way valve 60 to ensure that the pressure in the tanks 13 and 14 does not exceed a desired predetermined amount, e.g., 13 psi, when the unit is in a pressured mode. If that predetermined pressure is exceeded, the valves 95 will open up and vent to the atmosphere. Thus, with the liquid ring pump 21 in operation and the four-way valve 60 in the vacuum mode 61, the liquid ring vacuum pump 21 creates a vacuum with the aid from the water taken from the tank 14 at the pump water inlet line 70, and returns the water back to the tank at pump outlet 71 at a higher temperature. The vacuum line 19 is connected to the sludge tank 13, permitting the water and debris to be sucked up from the pipe to be cleaned through the vacuum hose 19 and normally open vacuum hose valve 94.

The four-way valve 60 is placed in its pressure mode 63 when it is desired to flush the system with air. In this position, the pump 21 operates to drawn air from the water-in-use tank 14 and discharge pressurized air into sludge tank 13 for cleaning the lines and to ensure that the float ball valves 64 and 65 do not become stuck in the up or closed position. Simultaneously, air is pulled from the atmosphere and discharged into the water-in-use tank 14 through the pump water outlet line 71.

The four-way valve 60 is preferably placed in its neutral position 62 when it is not necessary to place the system in a vacuum or a pressure mode. In this position, the air will be allowed to circulate without creating a vacuum.

Figure 4:
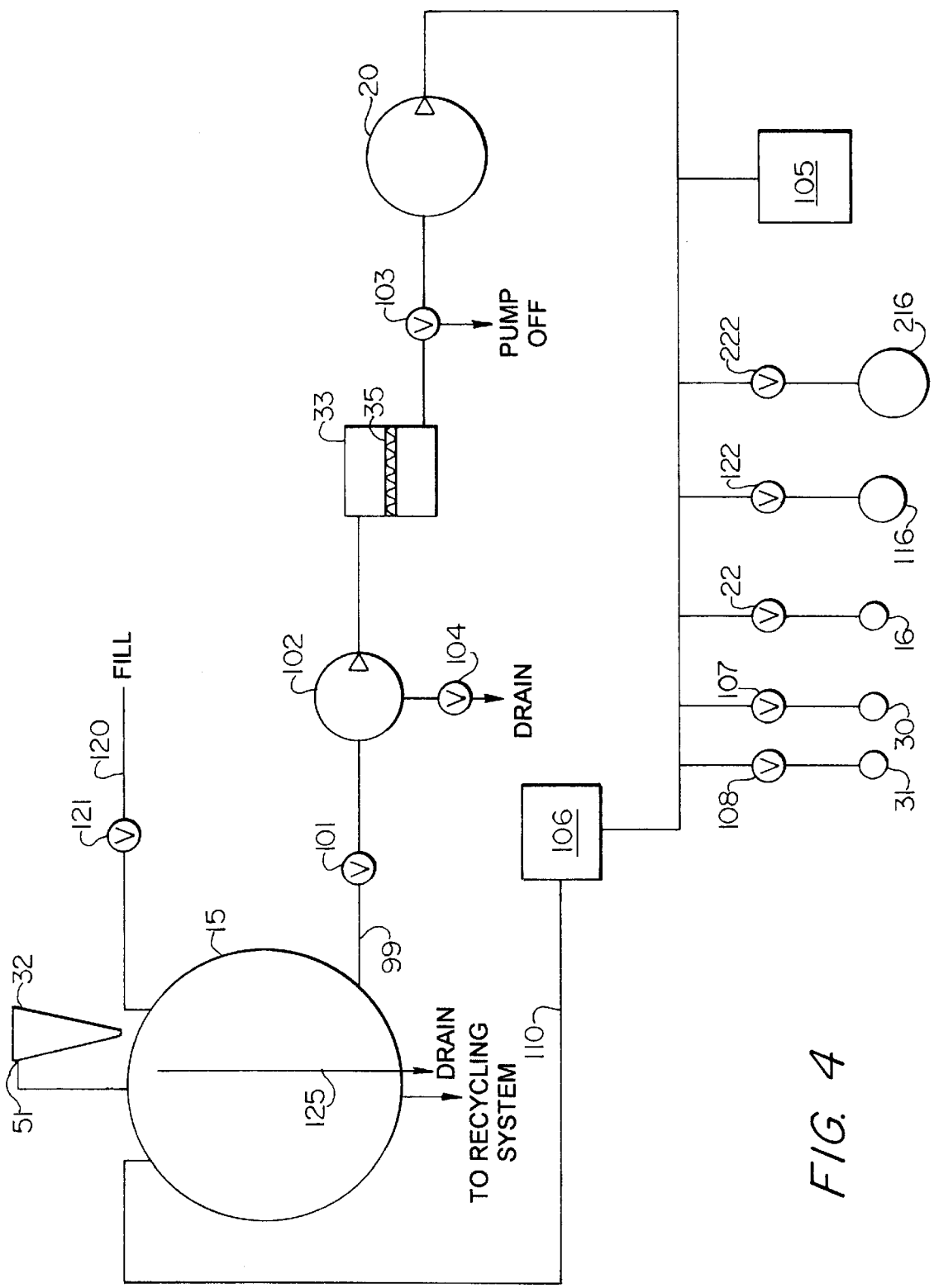
FIG. 4 is a schematic of the high pressure water supply system of the pipe cleaning vehicle of FIG. 1.

The high pressure water system is best illustrated in FIG. 4. A water supply tank outlet line 99 for the high pressure system extends into the water supply tank 15 adjacent its bottom. It is preferably spaced a small distance above the bottom of tank 15, e.g., 3 inches. This further ensures that no large particles enter the high pressure system or the high pressure pump 20, as the particles of debris will be heavier than the water and would tend to settle on the bottom of the tank 15. Prior to reaching the high pressure pump 20, a booster pump 102 will ensure a continuous flow of water at the desired pressure will be delivered to the high pressure pump 20. The ultra fine filter 33 is preferably disposed between the booster pump 102 and the high pressure pump 20. This ultra fine filter 33 may include a screen 35 or similar system for filtering out particle of any significant size. For example, it is preferred that this filter/screen design filter out all particles larger than 15–30$\mu$. Thus, this multi-stage filtration system provides a workable system wherein no particles greater than 15–30$\mu$, preferably 15$\mu$, reach the high pressure pump 20. This significantly increases the life of the high pressure pump 20, and may permit the high pressure pump 20 to last over 400 operational hours, where some prior art pumps have been known to last about 30 hours or less.

Valve 101 is preferably a hand-operated butterfly valve that is normally open but can be closed for servicing any equipment to the high pressure pump 20. High pressure system further includes valves 103 and 104 that permit the water to be drained off or pumped off prior to reaching the high pressure pump 20.

The high pressure pump 20 may be driven by any suitable drive mechanism including a hydraulic drive or mechanical drive coupled to the engine of the vehicle 1. The pump 20 pumps the clean water to any suitable number of high pressure hoses 16, 116, and 216. The high pressure hoses 16, 116, and 216 vary in design and permit the operator to use the hose best suited for an application, i.e., the pipe to be cleaned. For example, the hoses 16, 116, and 216 may vary in diameter. Accordingly, an operator would be able to select a larger hose 216 to clean a larger pipe, or a smaller hose 16 to clean a smaller pipe. The desired hose may be selected by opening the valve 22, 122, 222 corresponding to the respective hose 16, 116, 216 to be used. A vibrational damper 105 may be located between the high pressure pump 20 and the hoses 16, 116, and 216 to take the vibrations out of the system.

Selective flushing of the coarse filter 30 and fine filter 31 may be accomplished by connections of lines to this high pressure system. In the coarse filter 30 there is a nozzle manifold for its cleaning. The water that is running out from this is used for an additional help with sludge dumping and for cleaning of the whole body when it is tipped. The fine filter 31 also has a nozzle manifold for its cleaning. Automatically operable ball valves 107 and 108 open to permit this flushing.

A pressure regulatory valve 106 is positioned downstream from the hoses 16, 116, and 216, and the lines to the filters 30, 31. Pressure regulatory valve 106 controls the pressure of the high pressure system. A line 110 extends between the pressure regulatory valve 106 and the water supply tank 15 to dump the excess water back into the tank 15.

To initially fill the water supply tank 15, a fill line 120 is coupled to any suitable source and a valve 121 is opened to permit filling. An overflow drain line 125 with an open end adjacent the top of water supply tank 15, prevents overfilling and overflowing during operation by preventing the water level from exceeding the top of the drain line 125.

To operate the system, the water-in-use tank 14 is filled at the beginning of the day and this unit will run indefinitely without the need for refill due to the recycling system. Once this has been completed, there is no need to have external tanks or an additional water supply whether via a fire hydrant or other tanker trucks. Water is ejected from a spray nozzle 17 on a high pressure hose 16. Sludge-laden water is sucked up through vacuum hose 19 and deposited into the rear end of sludge tank 13 by a vacuum created by vacuum pump 21. The water used to create a seal in the vacuum pump 21 recycles through the water-in-use tank 14 and is constantly being cooled by the water in the water supply tank 15 and the sludge tank 13.

In the sludge tank 13, the heaviest of sludge remains on the sludge tank 13 floor. Other sludge laden water is cleaned through coarse filter 30. Cleaner water that has made it through coarse filter 30 is pumped by water recycling pump 28 through a fine filter 31. Particles from the fine filter 31 are filtered from the water and redeposited into the sludge tank 13, with the cleaner water from fine filter 31 being routed to a bank of cyclones 32. In the cyclones 32, the heavy or dirty water falls out of the bottom of the cyclones 32 back into the rear of the sludge tank 13, while the cleaner water from the cyclones 32 rises to the top and is deposited into the water storage tank 15. If the water supply tank 15 is substantially filled, as determined by sensor 39, the water recycling pump 28 repumps the filtered water in the water supply tank 15 through the fine filter 31 and cyclones 32 again.

The water is filtered again by the ultra fine filter 33 positioned between the water supply tank 15 and the high pressure pump 20. High pressure pump 20 supplies selected high pressure hoses 16, 116, 216 with water at a high pressure for spraying the inside of the pipe to be cleaned.

The multi-stage filtration system is extremely beneficial in that it reduces the water down to a substantially abrasive-free water supply which increases the life of the pump because there are no particles other than water to intermix with the mechanisms. Refiltering the water through the second and third filtering units, e.g, the fine filter 31 and the cyclones 32, helps to achieve the substantially abrasive-free water supply. It is essential that only the cleanest water is sent to the high pressure pump 20. This significantly prolongs life of high pressure pump 20.

If one or more hydraulic pumps are used in the vehicle 1, it may be preferable to run the fluid lines for the hydraulic fluid through the water supply tank 15 or the sludge tank 13. Running these hydraulic lines through these tanks 13 and 15 will provide cooling for the fluid and prevent the hydraulic fluid from becoming overheated during the operation of the pumps. In turn, this will permit the hydraulic pumps and its seals to last longer. Additionally, in a preferred embodiment, it is desirable to have the many of the valves and pumps be controlled from a common location to facilitate operation of the vehicle 1.

Moreover, in inlets and outlets in the respective tanks 13–15 are separated by a significant distance. These gaps prevent potential backflow and therefore prevent dirtier water from entering cleaner regions.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A vehicle for cleaning pipes, the vehicle comprising:
   a body;
   a tank housing, said tank housing being attached to the body and having first and second internal walls dividing the tank container into first, second, and third tanks, said second tank being positioned between the first tank and the third tank, said first internal wall separating the first and second tanks, and said second internal wall separating the second and third tanks;
   a pressure spray hose, said pressure spray hose being fluidly connected to said first tank;
   a vacuum hose, said vacuum hose being fluidly connected to said third tank;
   a pressure pump, said pressure pump being fluidly coupled to the pressure spray hose and the first tank for spraying fluid under pressure from the first tank through the pressure hose;
   a vacuum pump, said vacuum pump fluidly coupled to the second and third tanks, said vacuum pump being fluidly coupled to the third tank to permit a vacuum to be maintained in the third tank, and said vacuum pump being fluidly coupled to the second tank to permit fluid from the second tank to be used by the vacuum pump to create said vacuum; and
   wherein the second tank is disposed relative to the first and third tanks such that fluid in the first and third tanks reduce the temperature of the fluid in the second tank.

2. The vehicle of claim 1, further comprising a water recycling pump and a filtration system, said water recycling pump having a pump inlet being fluidly coupled to said third tank and a pump outlet fluidly coupled to said first tank wherein fluid from the third tank may be pumped through the filtration system, filtered, and deposited into the first tank.

3. The vehicle of claim 2, wherein said pump inlet of said water recycling pump is also fluidly coupled to said first tank, wherein fluid from the first tank may be pumped through the filtration system, filtered, and re-deposited into the first tank.

4. The vehicle of claim 3, wherein said filtration system includes a bank of cyclone filters.

5. The vehicle of claim 4, wherein the filtration system also includes a first filter having a screen, said filter being fluidly coupled to the cyclone filters and located upstream therefrom.

6. The vehicle of claim 5, wherein said cyclone filters and said first filter include an outlet coupled to the third tank, wherein particles filtered out from the cyclone filters and the first filter are re-deposited into the third tank.

7. The vehicle of claim 6, wherein said vehicle further includes a rotating screen filter mounted inside said third tank.

8. The vehicle of claim 6, wherein said vehicle further includes a filter mounted between the first tank and the pressure pump.

9. The vehicle of claim 3, further comprising a sensor and a valving arrangement, said sensor determining the water level inside the first tank, and said valving arrangement enabling the water recycling pump to draw fluid from only one of the first and third tanks at a given time based on the water level determined by the sensor.

10. The vehicle of claim 1, wherein said tank container is pivotally mounted to the body, and said vehicle further includes a cylinder for pivoting the tank container with respect to the body.

11. The vehicle of claim 1, wherein said vacuum pump is a liquid ring vacuum pump.

12. A vehicle for cleaning pipes, said vehicle comprising:
a body;
a sludge tank, said sludge tank being mounted to the body;
a water supply tank, said water supply tank being mounted to the body;
a high pressure pump, said high pressure pump being fluidly coupled to the water supply tank;
a spraying hose, said spraying hose being fluidly coupled to said high pressure pump for spraying water from the water supply tank into a pipe to be cleaned;
a vacuum hose, said vacuum hose being fluidly coupled to the sludge tank;
a vacuum pump, wherein said vacuum pump places the sludge tank in a vacuum permitting the vacuum hose to suck fluid and debris from a pipe to be cleaned;
a first filtration device, said first filtration device positioned inside said sludge tank for filtering particles from water inside the sludge tank and providing filtered watered at a first outlet of the first filtration device;
a second filtration device, said second filtration device being fluidly coupled to said water supply tank and said sludge tank such that water filtered by the second filtration device is supplied at a first outlet of the second filtration device and particles filtered out of the water by the second filtration device are supplied at a second outlet of the second filtration device, said first outlet of the second filtration device being fluidly coupled to the water supply tank and said second outlet of the second filtration device being fluidly coupled to the sludge tank; and a water recycle pump, said water recycle pump fluidly coupled to the first outlet of the first filtration device and said water supply tank, for providing pressurized water from at least one of said sludge tank and said water supply tank to said second filtration device.

13. The vehicle of claim 12, further comprising a third filtration device, said third filtration device fluidly coupled to the first outlet of the second filtration device, said third filtration device being coupled to said water supply tank and said sludge tank such that water filtered by the third filtration device is supplied at a first outlet of the third filtration device and particles filtered out of the water by the third filtration device are supplied at a second outlet of the third filtration device, said first outlet of the third filtration device being fluidly coupled to the water supply tank and said second outlet of the third filtration device being fluidly coupled to the sludge tank.

14. The vehicle of claim 13, further comprising a fourth filtration device, said fourth filtration device fluidly disposed between said water supply tank and said high pressure pump.

15. The vehicle of claim 14, wherein said third filtration device includes a plurality of cyclones, and said first filtration device includes a rotating screen.

16. The vehicle of claim 15, wherein said high pressure pump is fluidly coupled to the first and second filtration devices enabling the first and second filtration devices to be cleaned.

17. The vehicle of claim 14, further comprising a sensor and a valving arrangement, said sensor determining the water level inside the water supply tank, and said valving arrangement enabling the water recycling pump to draw fluid from only one of the water supply tank and the sludge tank at a given operating time based on the water level determined by the sensor.

* * * * *